United States Patent
Romano et al.

(10) Patent No.: US 7,853,962 B1
(45) Date of Patent: Dec. 14, 2010

(54) METHOD AND APPARATUS FOR OPTIMIZATION OF REMOTE PROCEDURE CALL COMMUNICATIONS

(75) Inventors: Ophir Romano, Pardesia (IL); Leonid Vasetsky, Haifa (IL); Shahar Glixman, Kiryat Tivon (IL); Israel Zvi Ben-Shaul, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1335 days.

(21) Appl. No.: 11/141,761

(22) Filed: May 31, 2005

(51) Int. Cl.
*G06F 9/44* (2006.01)
*G06F 15/16* (2006.01)

(52) U.S. Cl. .................. 719/330; 719/331; 709/203

(58) Field of Classification Search .......... 719/310, 719/315, 316, 330, 331, 332; 709/203, 217, 709/224
See application file for complete search history.

(56) References Cited

U.S. PATENT DOCUMENTS

| | | | |
|---|---|---|---|
| 4,498,142 A | 2/1985 | Advani et al. | |
| 4,916,605 A | 4/1990 | Beardsley et al. | |
| 5,454,108 A | 9/1995 | Devarakonda et al. | |
| 5,483,657 A | 1/1996 | Hatakeyama | |
| 5,555,388 A | 9/1996 | Shaughnessy | |
| 5,560,008 A | 9/1996 | Johnson et al. | |
| 5,596,754 A | 1/1997 | Lomet | |
| 5,682,534 A * | 10/1997 | Kapoor et al. | 719/328 |
| 5,740,367 A | 4/1998 | Spilo | |
| 5,745,747 A | 4/1998 | Chang et al. | |
| 5,956,712 A | 9/1999 | Bennett et al. | |
| 6,182,139 B1 | 1/2001 | Brendel | |
| 6,189,046 B1 * | 2/2001 | Moore et al. | 719/315 |
| 6,282,581 B1 * | 8/2001 | Moore et al. | 719/316 |
| 6,405,274 B1 | 6/2002 | Chan | |
| 6,408,342 B1 * | 6/2002 | Moore et al. | 719/330 |
| 6,567,405 B1 | 5/2003 | Borella et al. | |
| 6,574,654 B1 | 6/2003 | Simmons et al. | |
| 6,667,700 B1 | 12/2003 | McCanne et al. | |
| 6,668,270 B1 | 12/2003 | Simmons et al. | |
| 6,668,295 B1 | 12/2003 | Chan | |
| 6,828,925 B2 | 12/2004 | McCanne et al. | |
| 7,047,299 B1 | 5/2006 | Curtis | |
| 7,047,536 B1 * | 5/2006 | Duncan et al. | 719/330 |
| 7,116,249 B2 | 10/2006 | McCanne et al. | |
| 7,139,811 B2 * | 11/2006 | Lev Ran et al. | 709/217 |
| 7,299,282 B2 * | 11/2007 | Sarkissian et al. | 709/224 |

(Continued)

OTHER PUBLICATIONS

Muller at al. "Fast, Optimized Sun RPC Using Automatic Program Specialization", 1998 IEEE, 10 pages.*

(Continued)

*Primary Examiner*—Van H Nguyen
(74) *Attorney, Agent, or Firm*—Hickman Palermo Truong & Becker LLP

(57) ABSTRACT

A method and apparatus is disclosed for optimization of Remote Procedure Call (RPC) communications. A first RPC request to open a first transport connection is sent to a RPC service. A first RPC response is received from the RPC service. The first RPC response includes first information which indicates that first transport connection is open. The first information is stored in a cache. In response to a second RPC request to close the first transport connection, the closing of the first transport connection is delayed.

36 Claims, 6 Drawing Sheets

U.S. PATENT DOCUMENTS

| | | | |
|---|---|---|---|
| 7,424,722 B2 * | 9/2008 | Joseph | 719/330 |
| 2002/0019874 A1 | 2/2002 | Borr | |
| 2003/0009480 A1 | 1/2003 | Lin et al. | |
| 2003/0018785 A1 | 1/2003 | Eshel et al. | |
| 2003/0018878 A1 | 1/2003 | Dorward et al. | |
| 2003/0195937 A1 | 10/2003 | Kircher et al. | |
| 2004/0088376 A1 | 5/2004 | McCanne et al. | |
| 2004/0168057 A1 | 8/2004 | Margolus et al. | |
| 2004/0168058 A1 | 8/2004 | Margolus | |
| 2004/0174276 A1 | 9/2004 | McCanne et al. | |
| 2004/0215746 A1 | 10/2004 | McCanne et al. | |
| 2004/0243703 A1 | 12/2004 | Demmer et al. | |
| 2005/0125553 A1 | 6/2005 | Wu et al. | |
| 2005/0273792 A1 * | 12/2005 | Inohara et al. | 719/330 |
| 2006/0009213 A1 * | 1/2006 | Sturniolo et al. | 455/426.1 |

OTHER PUBLICATIONS

Zelesko et al. "Specializing Object-Oriented RPC for Functionality and Performance", 1996 IEEE, pp. 175-187.*

Narender et al. "Dynamic RPC for Extensibility", 1992 IEEE, pp. 93-100.*

Leighton, Luke Kenneth Casson, "Table of Contents," *DCE/RPC Over SMB—Samba and Windows NT Domain Internals*, Copyright 2000 by MTP, 5 pages.

Leighton, Luke Kenneth Casson, "SCE/RPC over SMB," Chapter 1, *DCE/RPC Over SMB—Samba and Windows NT Domain Internals*, Copyright 2000 by MTP, pp. 5-52.

The Open Group, "Frontmatter," CDE1.1: Remote Procedure Call, Copyright 1997, located on the internet at http://www.opengroup.org/onlinepubs/9629399/front.htm#tagcjh_01, downloaded on Sep. 19, 2005, 7 pages.

The Open Group, "Remote Procedure Call Model," CDE1.1: Remote Procedure Call, Copyright 1997, located on the internet at http://www.opengroup.org/onlinepubs/9629399/chap6.htm#tagcjh_11, downloaded on Dec. 12, 2005, 21 pages.

Academic Press Dictionary of Science and Technology, Oxford: Elsevier Science and Technology 1992, retrieved Aug. 13, 2008.

* cited by examiner

METHOD AND APPARATUS FOR OPTIMIZATION OF REMOTE PROCEDURE CALL COMMUNICATIONS

FIELD OF THE INVENTION

The present invention generally relates to client-server communications. The invention relates more specifically to optimization of Remote Procedure Call communications.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Remote Procedure Call (RPC) is a mechanism that allows one computer program procedure (the calling procedure) to call another procedure (the called procedure) where the calling procedure and the called procedure are established in different execution contexts that usually reside on physically separate computer systems that are linked by communication links or networks. By defining the execution semantics and protocols for making remote procedure calls, the RPC mechanism provides a procedure execution paradigm in which a calling procedure can make a RPC call to a called procedure executed on a remote computer system, where the RPC call may provide input parameters for the called procedure and may receive results returned from the called procedure. One specification of a RPC mechanism is the DCE 1.1 RPC specification, which can be found at http://www.opengroup.org/onlinepubs/9629399/toc.htm.

RPC mechanisms generally follow a client-server execution model. For example, a client established on a network usually requests the execution of a remote procedure from a remote service that is provided by a server established in the same or different network. To request the execution of the remote procedure, the client executes a calling procedure that makes a RPC call to the remote procedure on the remote service. The remote service on the server executes the remote procedure and provides the results back to the client.

As referred to herein, a RPC request is a request to a remote service to execute one or more operations. The one or more operations may be implemented as one or more remote procedures. A remote service that is capable of executing operations on behalf of a client is referred to herein as a RPC service, and the operations that can be executed by the RPC service are referred to herein as RPC operations. An RPC operation is one or more sequences of instructions that are entered from, and return control to, an external source. For example, an RPC operation may be executed by a RPC service in response to an RPC call that is invoked from a calling procedure on a client and that is included in a RPC request. After executing the RPC operation, the RPC service returns the results to the calling procedure in a RPC response.

In addition to providing the execution semantics for calling a procedure remotely, RPC mechanisms also provide for a sequence of communication protocols that define a communication channel between a client and a remote service. In order to exchange RPC requests and RPC responses, the client and the remote service agree on a common sequence of protocols and on the operational parameters of these protocols. A typical implementation of a RPC mechanism includes a network protocol, a transport protocol, and a RPC protocol. The communication protocols are usually layered, and the client and the remote service provide the addressing information that indicates to a protocol at a particular layer where to deliver the data for the protocol at the adjacent layer.

For example, in one implementation of a RPC mechanism, the client and the remote service may communicate over Transmission Control Protocol (TCP) connection. The client and the remote service exchange TCP packets over a TCP socket, which comprises an Internet Protocol (IP) address and a TCP port number for the client and an IP address and TCP port number for the remote service. The RPC requests and RPC responses exchanged by the client and the remote service are included in the payload portion of the TCP packets. In another implementation of a RPC mechanism, the client and the remote service communicate over a pipe Interprocessor Communication Mechanism (IPC), which is established over a Server Message Block (SMB) protocol. The SMB protocol identifies the pipe by a logical filename or a file handle of a file that is usually stored on the server that provides the remote service. The client and the remote service exchange RPC requests and RPC responses by reading from and writing to the file that is identified by the logical filename or the file handle.

The RPC relationship established between a client and a remote service is expressed as a binding. The binding includes information that associates a client's RPC call with the remote service's implementation of the RPC operation requested by the RPC call. In some implementations of RPC mechanisms, the binding information includes a sequence of communication protocols and network address information of the client and the remote service. The sequence of communication protocols is a valid combination of protocols, such as, for example, the combination of a network protocol (such as, for example, IP), a transport protocol (such as, for example, TCP), and a RPC protocol (such as, for example, Microsoft RPC (MS-RPC)). The network address of the client and the remote service provides complete transport address information of the client and the remote service. In a typical implementation of the RPC mechanism, a client must first execute one or more RPC calls in order to establish a transport connection to the remote RPC service. The client then needs to execute one or more RPC calls to establish a binding to the remote RPC service before the client can execute a RPC call for a remote operation provided by the remote RPC service.

Typically, a RPC mechanism is implemented by the Operating Systems (OS) executing on a client and a remote service. Since the client and the remote service are usually executing on physically separate computer systems, the RPC mechanism is inevitably utilized over a network or over some other type of communication link. When the network or the communication link over which a RPC call is made is relatively slow, use of the RPC mechanism may cause significant execution latency in a client that is relying on the RPC mechanism to utilize a particular remote RPC service, and the users of the client may experience delays in receiving services.

This problem is particularly acute when the RPC mechanism and the RPC calls it provides for are utilized by computer systems deployed in geographically dispersed enterprise networks. A geographically dispersed enterprise network may include a number of Local Area Networks (LANs) that are connected over one or more Wide Area Network (WAN) communication links. The geographically dispersed enterprise network usually includes one or more servers that provide one or more RPC services. The RPC services may be configured to respond to RPC requests received from other enterprise servers or clients, which servers or clients may be established in a remote LAN that is located across the WAN. The use of RPC mechanisms in such geographically dispersed enterprise networks may cause significant latency problems because a client established in a local LAN may have to make a series of RPC calls over a slow WAN link to a remote service established in a remote LAN.

For example, suppose that a user of a client in a local LAN wants to browse through a list of shares that are exported by a server in a remote LAN. In response to a request from the user for a listing of the exported shares, the client first executes an RPC call to open a pipe to a remote RPC service in the remote LAN. The RPC call is transmitted over the WAN to the remote RPC service, and the remote RPC service sends back an RPC response indicating that the pipe is open. The client then executes a second RPC call to bind the client to the remote RPC service, and waits for the remote RPC service to send back a RPC response. When the client receives the RPC response indicating that the binding succeeded, the client sends one or more RPC calls requesting a listing of the shares. In response to the one or more RPC calls, the remote RPC file service sends back one or more RPC responses with the listing of the shares. In order to complete the user request, the client then sends an RPC request to close the pipe, and the remote RPC file service responds with a RPC response indicating that the pipe is closed. Thus, in order to get the listing of the shares exported by the remote server, at least four roundtrip RPC communications were exchanged between the client and the remote RPC file service over the slow WAN link. If thereafter the user decides to request information about a particular share, another at least four roundtrip RPC communications need to be exchanged over the WAN link.

Thus, significant latency and performance degradation are observed at the client when a RPC operation needs to be performed at a remote RPC service that is located across the WAN in a remote LAN. Since the client must perform each RPC call on the remote service by sending sequences of RPC communications over a slow WAN link, the latency in response times from the user's perspective tends to be high. Even if the WAN link has sufficient bandwidth, the WAN latency still causes the execution of the RPC call to be slow. This problem is exacerbated when the user activity involving RPC calls to a RPC service across the WAN is repeated or comes in bursts of several repeating RPC call sequences.

Based on the foregoing, there is a clear need for a technique that provides for optimization of RPC communications exchanged over a slow communication link.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
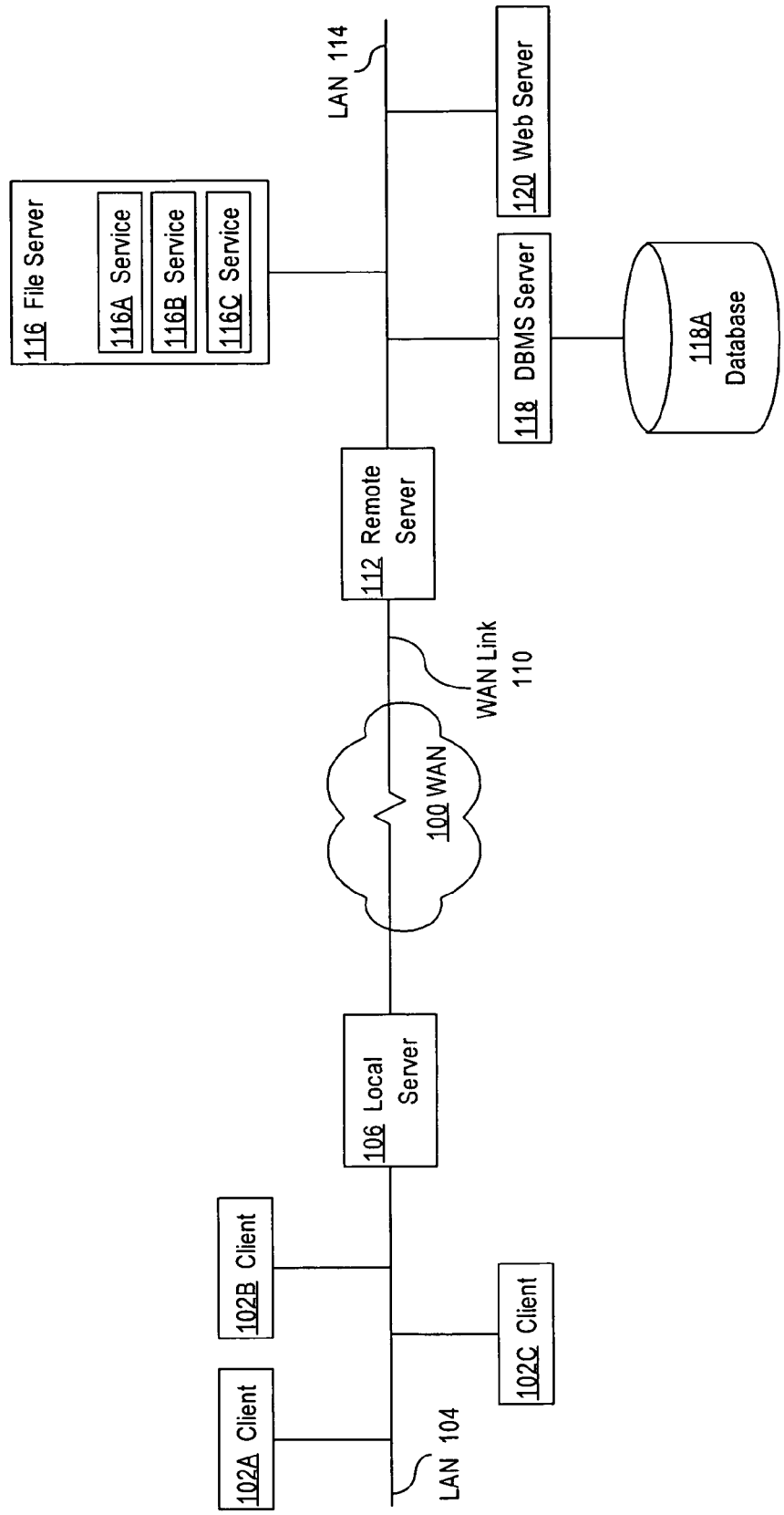
FIG. 1 is a block diagram that illustrates an overview of a system in which an embodiment may be implemented.

A method and apparatus for optimization of Remote Procedure Call (RPC) communications is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural and Functional Overview |
| 3.0 | Method for Optimization of RPC Communications |
| | 3.1 Reducing Roundtrip RPC Communications |
| | 3.2 Caching RPC Information |
| | 3.3 Closing Cached Transport Connections and Flushing the Cache |
| | 3.4 Additional Features and Embodiments |
| 4.0 | Implementation Mechanisms-Hardware Overview |
| 5.0 | Extensions and Alternatives |

1.0 General Overview

The needs identified in the foregoing Background, and other needs and objects that will become apparent for the following description, are achieved in the present invention, which comprises, in one aspect, a method for optimization of Remote Procedure Call (RPC) communications. A method and apparatus is disclosed for optimization of Remote Procedure Call (RPC) communications. A first RPC request is sent to open a first transport connection to a RPC service. A first RPC response is received from the RPC service. The first RPC response includes first information which indicates that first transport connection has been opened. The first information is stored in a cache. In response to a second RPC request to close the first transport connection, the closing of the first transport connection is delayed.

In a feature of this aspect, a second RPC response is created. The second RPC response indicates that the first transport connection is closed even though the closing of the first transport connection has been delayed. The second RPC response is sent in response to the second RPC request to close the first transport connection.

In one feature of the aspect, a third RPC request to open a new transport connection to the RPC service is received. A determination is made whether there is any open transport connection to the RPC service. If the first transport connection is still open, then the first information is retrieved from the cache, and the third RPC request is responded to by creating and sending a second RPC response that includes the first information.

In a feature of this aspect, the closing of the first transport connection is delayed for a predetermined interval of time. The first transport connection is closed after the predetermined interval of time expires. The predetermined interval of time represents an interval of time during which no RPC operations were sent to the RPC service over the first transport connection.

In one feature of the aspect, the first transport connection can be established according to a Server Message Block (SMB) protocol, a Transmission Control Protocol (TCP), or a HyperText Transfer Protocol (HTTP).

In a feature of this aspect, the steps of the aspect can be performed in a packet-switched network in a router, a switch, or a server.

In another aspect for optimization of RPC communications, a local server receives from a client a first RPC request to open a first transport connection to a particular RPC service of one or more RPC services. Access to the one or more services is managed by a remote server, which is communicatively connected to the local server over a slow communication link. The local server sends the first RPC request to the remote server and receives from the remote server a first RPC response. The first RPC response includes first information which identifies the first transport connection to the particular RPC service and indicates that the first transport connection is open. The local server then stores the first information in a cache. In response to receiving from the client a second RPC request to close the first transport connection to the particular RPC service, the closing of the first transport connection is delayed.

In a feature of this aspect, the local server creates a second RPC response. The second RPC response indicates that the first transport connection is closed even though the closing of the first transport connection has been delayed. In response to the second RPC request to close the first transport connection, the local server sends to the client the second RPC response.

In one feature of this aspect, the local server receives from the client a third RPC request to open a new transport connection to the particular RPC service. The local server determines whether there is any open transport connection to the particular RPC service by examining the contents of the cache. If the transport connection is still open, then the local server retrieves the first information from the cache, and responds to the third RPC request by creating and sending to the client a RPC response that includes the first information. In this feature, before receiving from the client the second RPC request to close the first transport connection to the particular RPC service, the local server may perform the steps of: receiving from the client one or more RPC operations for execution by the particular RPC service; sending the one or more RPC operations to the remote server over the first transport connection; receiving from the remote server one or more RPC responses which indicate that the one or more RPC operations have been executed by the particular RPC service; and storing in the cache the one or more RPC responses. In this feature, after responding to the third RPC request to open a new transport connection, the local server may also perform the steps of: receiving from the client a particular RPC operation of the one or more RPC operations for execution by the particular RPC service; retrieving from the cache a particular RPC response of the one or more RPC responses, wherein the particular RPC response was previously received from the remote server in response to executing the particular RPC operation by the particular service; and responding to the particular RPC request by sending the particular RPC response to the client. In some embodiments, the local server may respond to the one or more RPC operations with RPC responses from the cache only if the one or more RPC operations were issued from the same context as the RPC operations which caused the RPC responses to be cached. For example, the local server may respond to the one or more RPC operations with RPC responses from the cache only if the one or more RPC operations were issued from the same user that issued RPC operations the execution of which triggered the RPC responses that were cached.

In this feature of the aspect, the first transport connection may be any one of a pipe established according to a Server Message Block (SMB) protocol and a socket established according to a Transmission Control Protocol (TCP), and the particular RPC operation may be a RPC bind operation that binds the client to the particular RPC service through the first transport connection.

In a feature of this aspect, the local server closes the first transport connection to the particular RPC service after the expiration of a predetermined interval of time, and removes the first information from the cache.

In a feature of this aspect, the first RPC request to open the first transport connection to the particular RPC service is sent from a particular user of one more users associated with the client. In addition to storing the first information in the cache, the local server also stores second information that is associated with the first information and that identifies the particular user of the client.

In one feature of the aspect, the slow communication link between the local server and the remote server is any one of a dial-up connection, a Wide Area Network (WAN) connection, a Digital Subscriber Line (DSL) connection, and an Integrated Services Digital NetWork (ISDN) connection. In this feature, the client is communicatively connected to the local server over a first connection, and the one or more RPC services are communicatively connected to the remote server over a second connection. The first and the second connections may be established over a first Local Area Network (LAN) and a second LAN, respectively. The first and second connections may also be DSL connections, WAN connections, or ISDN connections that are faster than the slow communication link between the local server and the remote server.

In other aspects, the invention encompasses a computer apparatus and a computer-readable medium configured to carry out the foregoing steps.

2.0 Structural and Functional Overview

FIG. 1 is a block diagram that illustrates an overview of a system in which an embodiment may be implemented.

Local Area Network (LAN) 104 is communicatively connected to LAN 114 over Wide Area Network (WAN) 100. One or more clients, such as clients 102A, 102B, and 102C are communicatively connected over LAN 104 to local server 106. Local server 106 provides access to WAN 100 for one or more clients on LAN 104. Local server 106 is also communicatively connected, over WAN 100, to remote server 112 via WAN link 110.

Remote server 112 is communicatively connected over LAN 114 to one or more servers, such as file server 116, Database Management System (DBMS) server 118, and web server 120. File server 116 provides one or more RPC services, such as, for example, RPC services 116A, 116B, and 116C.

In operation, local server 106 intercepts a RPC request from a client on the local LAN 104, such as, for example, client 102A. The intercepted RPC request is for execution of a RPC operation on a RPC service established on the remote LAN 114, such as, for example, RPC service 116A. Local server 106 sends to remote server 112, over WAN link 110, a first RPC request to open a transport connection to RPC service 116A. Remote server 112 receives the RPC request to open the transport connection, and sends it to RPC service 116A. RPC service 116A confirms in a RPC response to remote server 112 that the transport connection is open, and remote server 112 sends the RPC response to local server 106. Local server 106 receives the RPC response, and caches first information included in the RPC response, which first information indicates that the transport connection is open. Local server 106 then sends the RPC response to client 102A.

Upon receipt of the RPC response from local server 106, client 102A sends to RPC service 116A over the transport connection one or more RPC requests to execute one or more RPC operations. The one or more RPC operations may include an RPC bind operation to bind client 102A to RPC service 116A, and may also include one or more other RPC operations for execution by RPC service 116A. After client 102A has completed the execution of the one or more RPC operations, client 102A sends a second RPC request to RPC service 116A to close the transport connection. Local server 106 intercepts the second RPC request and, instead of sending the second RPC request to remote server 112 and RPC service 116A, delays the closing of the transport connection. Local server 106 then creates a second RPC response that indicates that the transport connection is closed even though the closing of the transport connection has been delayed and the transport connection is still open. Local server 106 then responds to the second RPC request to close the transport connection by sending the second RPC response to client 102A. In this way, client 102A is notified that the transport connection to RPC service 116A has been closed and client 102A can complete its RPC session. Local server 106, however, has kept the transport connection open. By creating a second RPC response and responding to the second RPC request locally, local server 106 saves one roundtrip of RPC communications over the slow WAN link 110.

Suppose that thereafter client 102A needs to execute another RPC operation on RPC service 116A. Client 102A sends a third RPC request to open a transport connection to RPC service 116A. Local server 106 intercepts the request, and since the transport connection to RPC service 116A is still open, instead of transmitting the RPC request to remote server 112 over the slow WAN link 110, local server 106 retrieves from the cache the first information which indicates that the transport connection is open. Local server 106 creates a RPC response that includes the first information, and sends this RPC response to client 102A indicating that the transport connection is open. In this way, by responding with information from the cache, local server 106 saves one roundtrip of RPC communications over the slow WAN link 110.

Embodiments of the techniques described herein may be implemented in operational contexts and/or in systems that are different than the operational context and the system depicted in FIG. 1. For example, in one embodiment, a client may perform the steps performed by the local server described above. In this embodiment, the client may be connected to the remote server over a dial-up connection, DSL, an ISDN line, or any other type of slow or relatively slow communication link. Further, the local server 106 may be eliminated. In addition, one or more servers on the remote LAN may provide DBMS services, web services, or any other RPC services that support the execution of RPC operations. For example, a DBMS server, such as DBMS server 118 depicted in FIG. 1, may provide RPC access to one or more databases, such as database 118A.

Furthermore, in addition to caching information about opened transport connections, in one embodiment the local server may also cache any or all RPC responses that are received for the client from the remote RPC service. In this embodiment, the local server may respond to subsequent RPC calls from the client to the remote RPC service by using the cached information, thus saving RPC roundtrip communications over the slow communication link. For example, the techniques described herein may be used to optimize RPC communications of clients that send RPC requests to a remote RPC service in sequences of repeated bursts. When the client executes a sequence of RPC requests for the first time (for example, a sequence of an RPC open transport connection call, RPC bind call, RPC execute operation call, and RPC close transport connection call), the local server delays the closing of the transport connection and caches information that is received in the RPC responses from the RPC service to the client. If the client thereafter invokes a second sequence of the same RPC requests (for example, by issuing the same RPC calls with the same parameters), the local server may respond without sending any RPC requests over the slow communication link by creating locally RPC responses using the cached information. Thus, the RPC response information from the execution of the first sequence of RPC requests is used to handle locally the next sequence of RPC requests.

The caching operations described herein may be implemented through mechanisms other than mechanisms at local server 106, e.g., through mechanisms at client 102A, 102B, or 102C.

In some embodiments, the remote server itself may provide the RPC service or services that are requested by clients on the local LAN. In addition, some embodiments may include any number of clients, local and remote servers, and remote RPC services. Thus, the techniques and approaches described herein are not limited to any particular operational context or system, and the operational context and the system depicted in FIG. 1 are to be regarded in an illustrative rather than a restrictive sense.

Figure 2A:
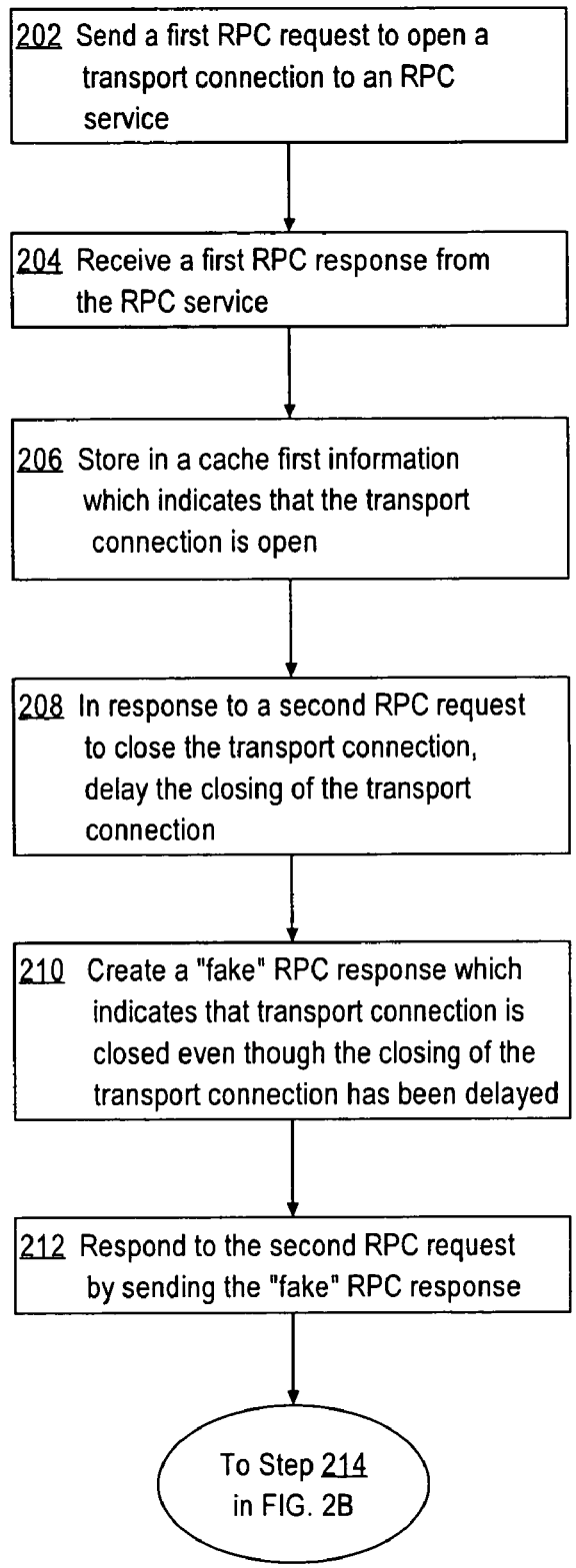
FIG. 2A is a flow diagram that illustrates a high level overview of one embodiment of a method for optimization of RPC communications.
Figure 2B:
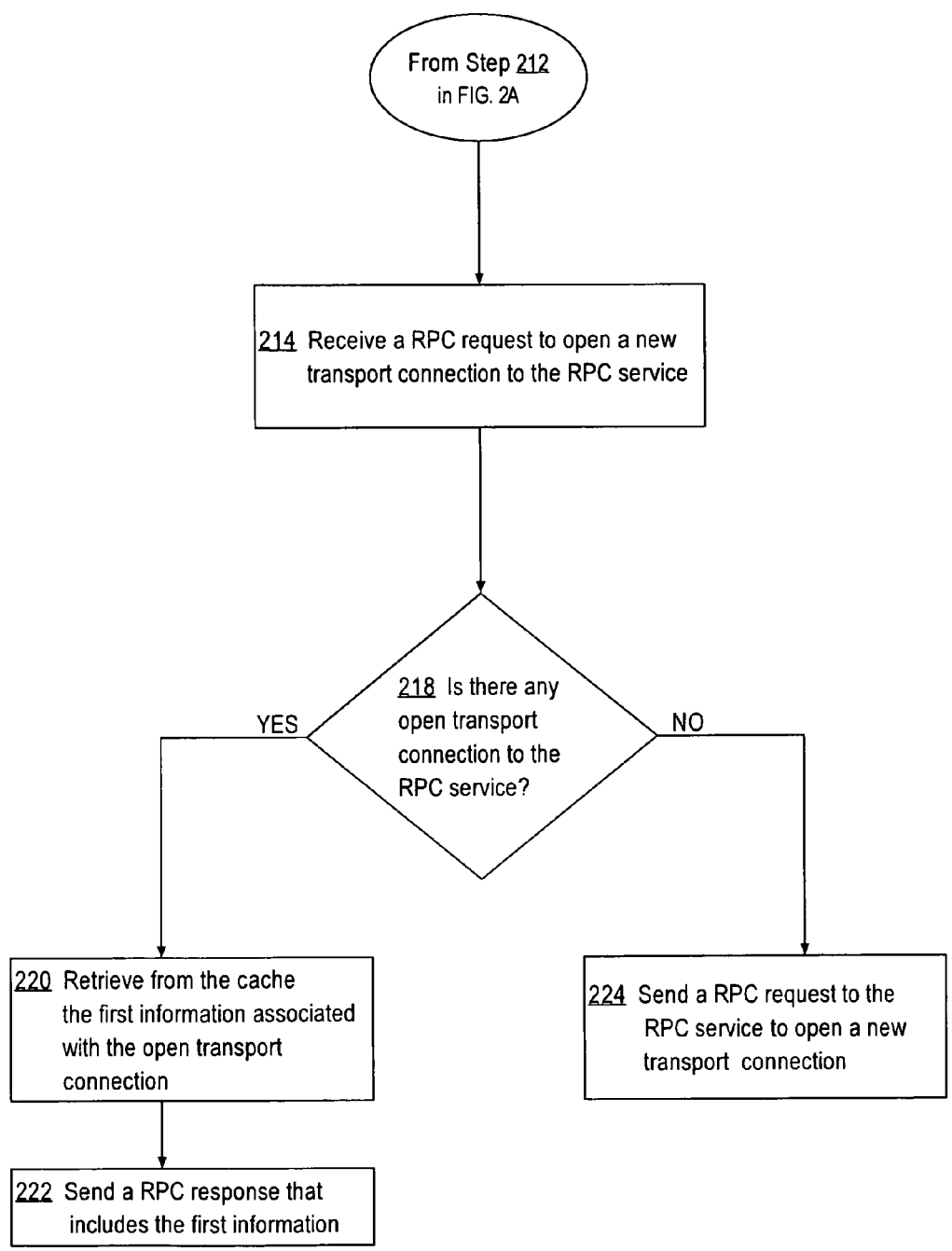
FIG. 2B is a continuation of the flow diagram in FIG. 2A.

3.0 Method for Optimization of RPC Communications 3.1 Reducing Roundtrip RPC Communications FIGS. 2A and 2B are flow diagrams that illustrate a high level overview of one embodiment of a method for optimization of RPC communications. In this embodiment, the exchange of RPC communications is optimized by reducing the number of roundtrip RPC requests and responses between a client and a RPC service.

In one embodiment, the steps of the method illustrated in FIGS. 2A and 2B are performed by a local server on a LAN that is local to the client that requests the RPC service. The RPC service is established in a LAN that is remote to the client and that is communicatively connected to the local LAN over a slow communication link. In other embodiments, the client or any other processor proximate to the client may perform the steps.

Referring to FIG. 2A, in step 202 the local server sends a first RPC request to open a transport connection to a RPC service. In the step 204 the local server receives a first RPC response from the RPC service. The first RPC response includes first information which indicates that the transport connection is open. In one embodiment, the transport connection is a pipe mechanism that is implemented as a file stored in the file system of the server that hosts the RPC service. In this embodiment, the first information included in the first RPC response is a file handle to the file representing the pipe.

In step 206 the local server stores the first information in a cache. In one embodiment, the first information is stored in the cache on a per-user basis. In this embodiment, each transport connection that is opened by a client for the purpose of executing a RPC call at the RPC service is associated with a particular user of the client. The user is identified by a User ID (UID), and the local server stores in the cache the UID of the particular user that opened the transport connection along with the first information which indicates that the transport connection is open.

In step 208, in response to receiving a second RPC request to close the transport connection, the local server delays the closing the transport connection. In some embodiments, the delay may be in the order of milliseconds. In other embodiments, the delay may be seconds or even minutes. The delay in closing the transport connection may be configurable by an administrator of the local server, and depends at least in part on the patterns and types of RPC calls invoked by a client for a particular RPC service.

In step 210 the local server creates a "fake" RPC response, which indicates that the transport connection is closed even though the closing of the transport connection has been delayed and the transport connection is still open. In this context, "fake" means that while in fact the transport connection is still open, the RPC response indicates to the client that transport connection is closed. The "fake" RPC response is used to notify the client that the RPC request to close the transport connection has succeeded, so that client may complete the execution of the procedure that invoked the RPC request. The ability of the local server to create "fake" RPC responses allows the local server to reduce the roundtrip RPC communications without requiring its RPC clients to change their RPC execution semantics. In step 212 the local server responds to the second RPC request to close the transport connection by sending it the "fake" RPC response.

Referring to FIG. 2B, in step 214 the local server receives a RPC request from the client to open a new transport connection to the RPC service. In step 218, the local server determines whether there is any transport connection from the client to the RPC service that is cached and open but that is not currently used or bound to by the client. For example, by checking the contents of the cache, the local server determines whether there is any unused and open transport connection from the client to the RPC service. If the cache does not store any open and unused transport connection, in step 218 the local server sends the RPC request it received from the client to the RPC service to open a new transport connection.

If in step 218 the local server determines that there is an open and unused transport connection from the client to the RPC service, in step 220 the local server retrieves from the cache the first information that is associated with this transport connection. In step 222, the local server creates a RPC response that includes the first information and that notifies the client that the transport connection is open. In some embodiments, the local server marks the contents of the cache to indicate that the transport connection is currently being used. In other embodiments, the local server may remove from the cache the first information that is associated with this particular transport connection. In this way, local server maintains in the cache only transport connections that are open and unused.

Figure 3A:
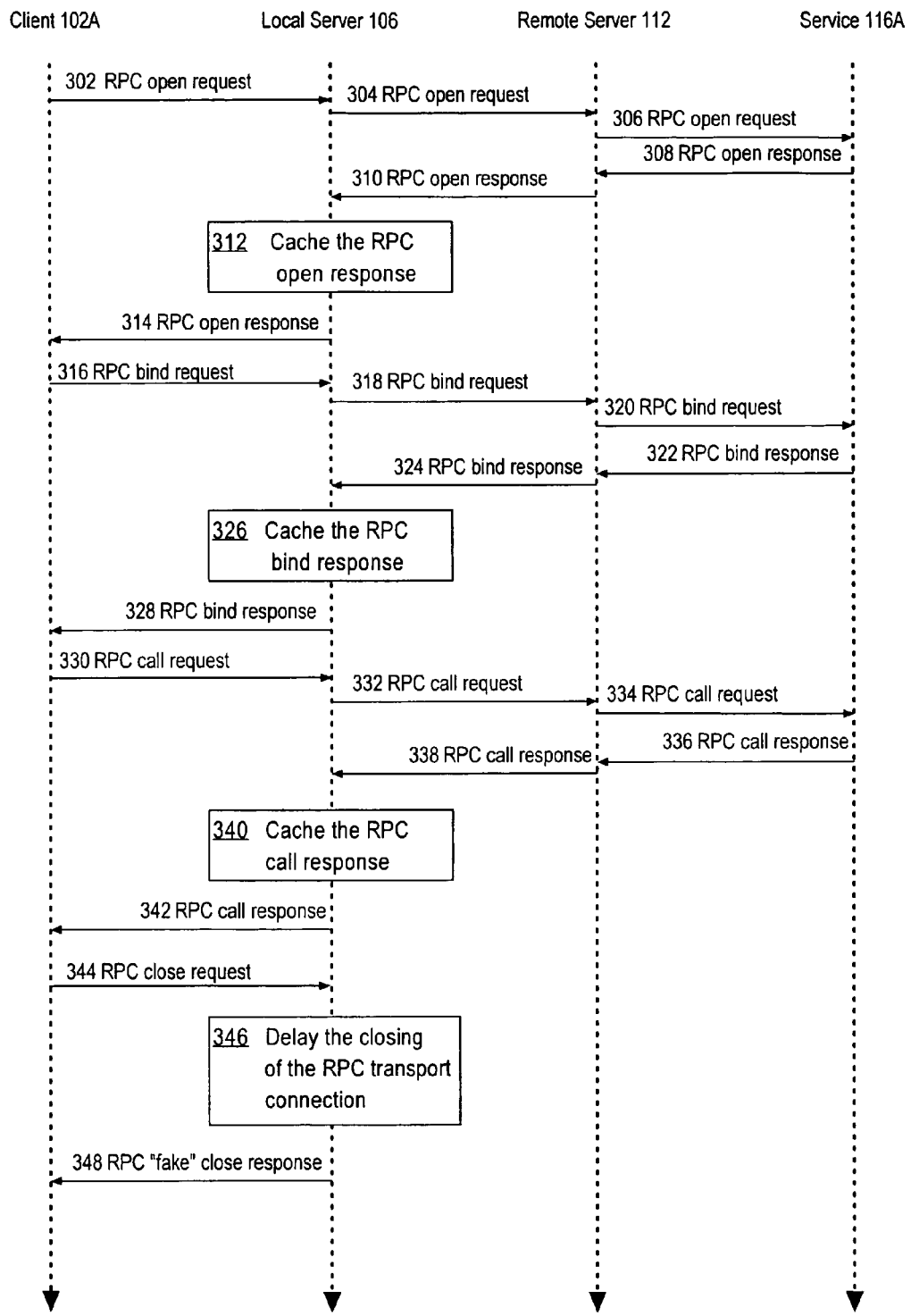
FIG. 3A is a message ladder diagram that illustrates the RPC messages exchanged according to one embodiment.
Figure 3B:
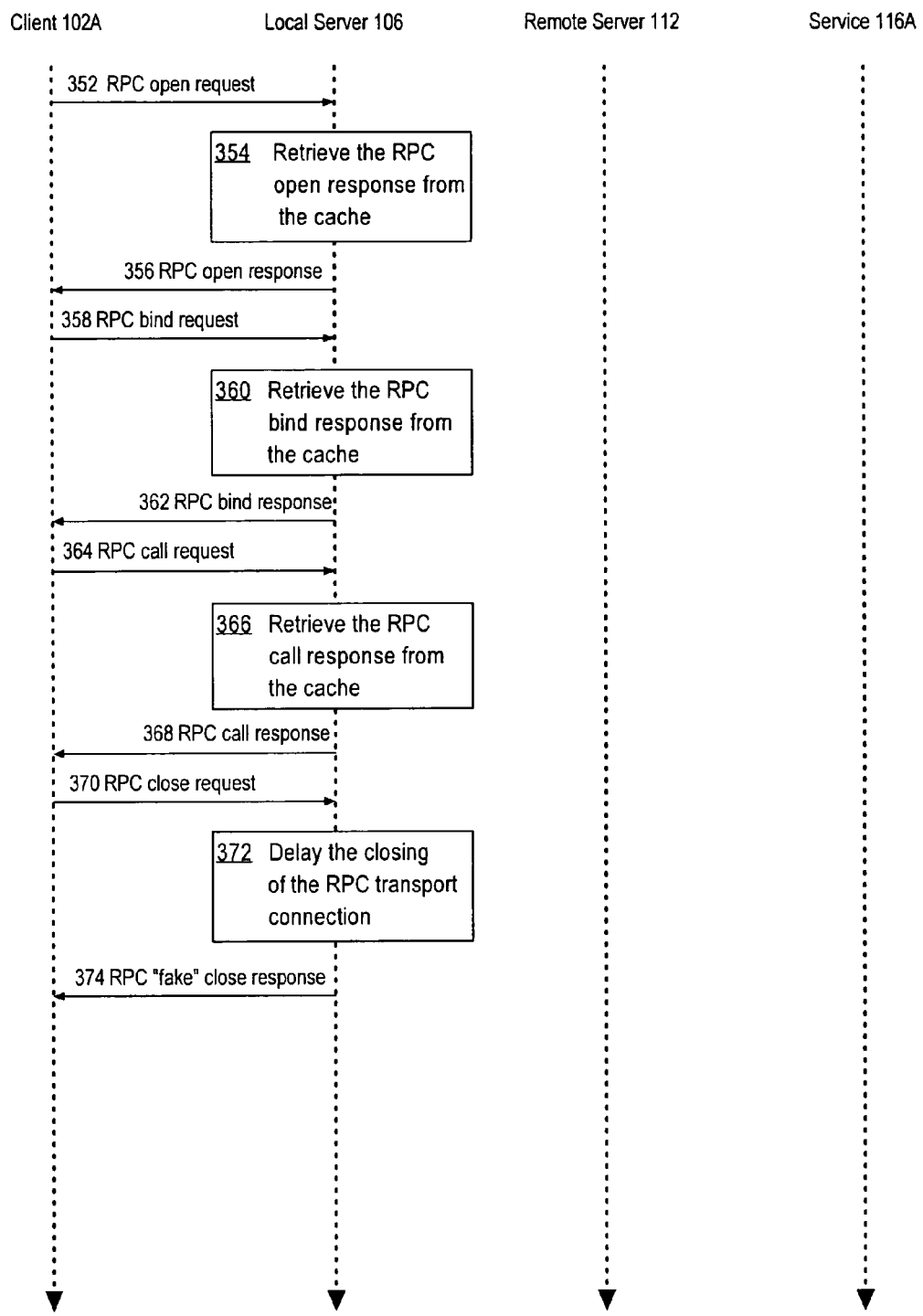
FIG. 3B is a continuation of the message ladder diagram in FIG. 3A.

FIGS. 3A and 3B depict a message ladder diagram that illustrates the RPC requests and RPC responses exchanged according to one embodiment between a client, a local server, a remote server, and a RPC service, such as client 102A, local server 106, remote server 112, and RPC service 116A depicted in FIG. 1. Specifically, FIGS. 3A and 3B depict the communications exchanged according to an embodiment in which a user of client 102 invokes a MS-RPC request to get a list of the file shares located on file server 116, which provides RPC service 116A. In this embodiment, the RPC service is the SRVSVC, which is a service provided in a Microsoft Windows® Operating System (OS) that can perform RPC operations on behalf of remote clients. The SRVSVC RPC operation that returns the list of file shares on a file server is the NetrShareEnum procedure.

In order to make an MS-RPC call to NetrShareEnum in response to the request from its user, client 102A first connects to the IPC$ tree of file server 116. The IPC$ tree is a mechanism in the Microsoft Windows® family of Operating Systems (OS) that is implemented as a file system share. The IPC$ tree maintains information about the transport connectivity available to the services supported by the OS. After connecting to the IPC$ tree, client 102A invokes the following sequence of RPC requests: a RPC open transport connection request, a RPC bind request, a RPC call to NetrShareEnum on the bound transport connection, a RPC close transport connection request. Once the transport connection is closed, client 102A disconnects from the IPC$ tree. The embodiment illustrated in FIGS. 3A and 3B presumes that client 102A is already connected to the IPC$ tree of file server 116, and thus FIGS. 3A and 3B depict only the exchanged RPC messages. In some embodiments, connecting to the IPC$ tree may also be performed by using a RPC mechanism, and in these embodiments RPC calls to connect to or disconnect from the IPC$ tree may also be handled according to the techniques for optimization of RPC communications described herein.

Referring to FIG. 3A, client 102A sends to RPC service 116A message 302 that includes a RPC open transport connection request. In this embodiment, the RPC open transport connection request includes an RPC call to open a named pipe to the RPC service. Local server 106 intercepts message 302 and examines its cache to determine whether the client has an open pipe to RPC service 116A. Upon determining that the cache has no open pipe to RPC service 116A, local server 106 sends to remote server 112 message 304 that includes the RPC open transport connection request included in message 302. Remote server 112 sends the RPC open transport connection request to RPC service 116A in message 306.

In response to the RPC open transport connection request, RPC service 116A sends to remote server 112 message 308 that includes a RPC open response. In this embodiment, the RPC open response includes a file handle to the file that represents the pipe over which RPC service 116A is offered. For example, the RPC service 116A may be a SRVSVC service that is provided in the Microsoft Windows® family of Operating Systems. In this example, the file that represents the pipe may be located in the file system of file server 116 at "\srvsvc".

Remote server 112 receives message 308, and sends to local server 106 message 310, which includes the RPC open response. Upon receiving the RPC open response in message 310, local server performs step 312, in which the RPC open response and the file handle to the pipe supported by RPC service 116A are cached. Local server 106 then sends the RPC open response to client 102A in message 314.

Upon receiving the RPC open response, client 102A sends to RPC service 116A message 316, which includes a RPC bind request to bind the client to the RPC service. In the depicted embodiment, the RPC bind request includes a RPC bind call to bind the pipe supported by RPC service 116A to client 102A. Local server 106 intercepts message 316, and sends the RPC bind request to remote server 112 in message 318. Remote server 112 receives message 318 and sends the RPC bind request to RPC service 116A in message 320. RPC service 116A binds client 102A to its pipe, and returns to remote server 112 message 322, which includes a RPC bind response. Remote server 112 sends the RPC bind response to local server 106 in message 324.

Upon receiving message 324, local server 106 performs step 326, in which the RPC bind response and the information included therein are cached. Local server 106 then sends the RPC bind response to client 102A in message 328.

Upon receiving the RPC bind response, client 102A sends to RPC service 116A message 330, which includes a RPC call to procedure NetrShareEnum on RPC service 116A. Local server 106 intercepts message 330, and sends the RPC call request to remote server 112 in message 332. Remote server 112 receives message 332 and sends the RPC call request to RPC service 116A in message 334. RPC service 116A executes the NetrShareEnum, and returns to remote server 112 message 336, which includes a RPC call response that includes the list of file shares available on file server 116. Remote server 112 sends the RPC call response to local server 106 in message 338.

Upon receiving message 338, local server 106 performs step 340, in which the RPC call response and list of file shares included therein are cached. Local server 106 then sends the RPC call response to client 102A in message 342.

Upon receiving message 342, client 102A knows that it has completed the RPC call to NetrShareEnum, and sends to RPC service 116A message 344, which includes a RPC close transport connection request to close the connection to the service. Local server 106 intercepts message 344 and performs step 346, in which the closing of the transport connection is delayed. Instead of sending the RPC close transport connection request to remote server 112, local server 106 creates a "fake" RPC close transport connection response, which indicates that the transport connection is closed even though the closing of the transport connection has been delayed and the transport connection is still open. Local server then sends the "fake" RPC close response to client 102A in message 348.

At this point, client 102A has completed the MS-RPC request for the list of file shares located on file server 116, and the user is presented with this list. In order to complete the MS-RPC request, there were three roundtrip RPC communications exchanged between local server 106 and remote server 112 over the slow WAN link 110. Further, there would have been one more roundtrip RPC communication exchanged if local server 106 had closed the transport connection normally by sending the RPC close request to remote server 112 and by receiving a "real" RPC close response.

Suppose that after client 102A has completed the MS-RPC request for the list of file shares on file server 116, an application invoked by the user requests the list of file shares on file server 116 in a subsequent MS-RPC request. In this scenario, client 102A receives the MS-RPC request for the same list of shares, and client 102A needs to execute the exact same sequence of RPC requests to RPC service 116A. FIG. 3B depicts the messages exchanged in this scenario.

In FIG. 3B, client 102A sends to RPC service 116A message 352, which includes a RPC open transport connection request. Local server 106 intercepts the message, and performs step 354. In step 354, local server 106 examines the contents of its cache in order to determine whether there is a open and unused transport connection to RPC service 116A. When local server 106 finds an open transport connection, it retrieves from the cache an RPC open response and/or the information that indicates that the transport connection is open. In the depicted embodiment, the retrieved RPC open response includes the file handle to the pipe supported by RPC service 116A. Local server includes the RPC open response in message 356, which is sent to client 102A.

Upon receipt of message 356, client 102A determines that a transport connection to RPC service 116 is opened and sends to local server 106 message 358, which includes a RPC bind request to bind the client to the RPC service over the transport connection.

Local server 106 receives message 358, and in response performs step 360. In step 360, local server 106 examines the contents of the cache to determine whether a RPC bind response that binds client 102A to RPC service 116 over the open transport connection is stored in the cache. When local server 106 finds such RPC bind response in the cache, it retrieves the RPC bind response, and sends to client 102A in message 362.

Upon receipt of message 362, client 102A sends to local server 106 message 364, which includes a RPC call to procedure NetrShareEnum on RPC service 116A. Local server 106 receives message 364, and examines the contents of the cache to determine whether it stores a RPC call response with information about the list of file shares available on file server 116. When local server finds a RPC call response in the cache, local server retrieves the RPC call response and sends it in message 368 to the client 102A.

Upon receipt of message 368, client 102A completes the MS-RPC request for the file shares on file server 116 by sending to local server 106 message 370, which includes a RPC close transport connection request. Local server 106 receives message 370 and performs step 372, in which the local server delays again the closing of the transport connection. Local server 106 then creates a "fake" RPC close transport connection response, which indicates that the transport connection is closed even though the closing of the transport connection has been delayed. Local server 106 then sends the "fake" RPC close response to client 102A in message 374. Upon receipt of message 374, client 102A completes the MS-RPC request, and presents the list of files shares available on file server 116 to the application invoked by the user.

Thus, in completing the subsequent MS-RPC request, there are no roundtrip RPC communications exchanged between local server 106 and remote server 112 over the slow WAN link 110. In this particular embodiment, the techniques for optimization of RPC communications described herein resulted in a 100% reduction in the roundtrip exchange of RPC requests and RPC responses, that is, in processing the subsequent MS-RPC request, there was no need to exchange RPC requests and RPC responses with RPC service 116A over the slow WAN link 110 because all the information needed by client 102A was cached by local server 106, and all needed RPC responses were created and send locally by the local server.

In other embodiments, the subsequent RPC call request may be different than the previously executed RPC call request for which a RPC call response was cached. For example, the RPC call request in message 364 may a RPC call to execute the NetrShareGetInfo RPC operation to retrieve information about a particular file share, while the cached information from the pervious RPC call request may the RPC call response from the NetrShareEnum RPC operation. In these embodiments, the local server recognizes that it does not have a RPC call response stored in the cache, and sends the RPC call request to remote server 112, which resends the RPC call request to RPC service 116A for execution. Thus, in these embodiments the reduction in roundtrip RPC communications may not reach 100% but is still significant because the local server is still able to respond with information from the cache to RPC requests to open a transport connection to the RPC service and to bind the client to the service over the transport connection. The techniques described herein are not limited to caching RPC responses for only some particular RPC calls, and thus the examples of cached RPC responses provided herein are to be regarded in an illustrative rather than a restrictive sense.

3.2 Caching RPC Information
3.2.1 Caching Transport Session Information The techniques described herein provide for caching any type of information associated with the sequence of protocols used by a particular RPC mechanism. In some embodiments, the RPC responses received from a RPC service are cached in their entirety before these RPC responses are sent to the client. In other embodiments, information included in the RPC responses is cached separately. The techniques described are not limited to caching only a particular protocol information, and any type of information that may be needed by a local server to create an appropriate RPC response may be cached for future use.

For example, in one embodiment the RPC mechanism used by a client and a remote RPC service operates according to the MS-RPC client-server protocol. The MS-RPC protocol uses the DCE-RPC protocol for transferring RPC requests and RPC responses. In this embodiment, the DCE-RPC protocol may operate over SMB protocol, or directly over TCP. The MS-RPC protocol provides clients with access to various RPC services including, but not limited to, the NETLOGON service (which provides for remote logging), the SRVSVC service (which provides for various file share and file administration management), WKSSVC service (which provides for connection to other computer systems on the network), WINREG service (which provides for registry management), SVCCTL service (which provides for remote controlling of local services), ATSVC service (which provides for remote scheduling of events), SPOOLSS service (which provides for printer spooling), IPSEC (which provides for IPSec protocol management), and SFCAPI (which provides for file protection management). For each RPC service, the MS-RPC protocol defines a set of RPC operations, where input and output parameters are defined for each RPC operation.

In this embodiment, each MS-RPC request to execute a particular RPC operation on a particular remote RPC service requires the execution of a particular sequence of RPC calls. For example, when the MS-RPC protocol is implemented over SMB transport protocol, the following MS-RPC calls need to be executed in order for the RPC operation to be performed: a RPC call to facilitate the login of a user of the client invoking the MS-RPC request, a RPC call to connect to the IPC$ tree on the server providing the RPC service, a RPC call to open the relevant pipe (for example, \pipe\srvsvc\), a RPC call to bind the client to the pipe, a RPC call to perform the particular RPC operation (for example, NetrShareGetInfo to get information about a specific share), a RPC call to close the pipe, and a RPC call to disconnect from the IPC$ tree.

In this embodiment, the local server may cache any information returned from the RPC service in response to executing any of the above RPC calls. Depending on the particular user activity at a client, different combinations of the RPC responses to the above RPC calls may be cached. For example, the RPC responses to the RPC IPC$ connect call, the RPC open call, and the RPC bind call are frequently cached because these RPC calls are going to be the same regardless of the particular RPC operation that is included in the MS-RPC request. In addition, in this embodiment the information in the cache may be stored on a per-client, per-user, per-IPC$-tree, and per-pipe basis by using a client ID, a User ID, a Tree ID, and a File ID to identify the client, the user, the IPC$ tree, and the pipe, respectively.

In other embodiments, the RPC mechanism used by a client and a remote RPC service operates according to a RPC protocol that uses TCP and IP as the transport and network protocols. In these embodiments, the transport connection information cached by a local server may be any information associated with the RPC, TCP, or IP protocol. For example, the RPC responses sent from the RPC service to the client may include information identifying the TCP socket over which RPC requests and RPC responses are exchanged and information that binds the client to the RPC service over the TCP socket. In some embodiments, the RPC protocol may also be used over a connectionless transport protocol, such as, for example, the User Datagram Protocol (UDP). In these embodiments, the transport connection information cached by the local server may be any information that is included in the UDP datagrams, which information may include transport or network protocol information (such as, for example, IP addresses and port numbers) and specific RPC protocol information (such as, for example, information about binding a client to a particular RPC service).

3.2.2 Caching Information for Particular RPC Operations Performed over the Transport Connections The RPC responses returned by a RPC service after the execution of a particular RPC operation may be cached in their entirety, or the information included in the RPC responses may be parsed and stored in logically separate places in the cache. The parsing of the RPC responses may be based on the input or output parameters included in the RPC call requests, or it may be based on any criteria that allows a local server to create a valid RPC response from the cache.

In some embodiments, a RPC call to execute a particular RPC operation at a RPC service may be executed simultaneously over more than one transport connection. In this embodiment, the RPC response may also be returned by RPC service over more than one transport connection. The RPC response is written to the cache only after it is received in its entirety over any and all transport connections.

In some embodiments, a RPC response returned by the RPC service in response to the execution of a particular RPC operation may not fit in a single transport protocol packet. For example, in an embodiment using pipes as the transport protocol, in response to the execution of a RPC operation, the RPC service may write a large amount of data in the pipe. In this embodiment, a buffer is provided at a local server handling the caching, which buffer is used to store the data read from the pipe and offset information indicating the portions of data that have been sent from the local server to the client. When all the data returned from the RPC service is sent to the client, the data is stored in the cache, and the buffer is released. In this way, the data returned by the RPC service may be sent to the client before the entire data is read from the pipe, while allowing for the data to be stored in the cache in its entirety.

In some embodiments, caching will be denied for RPC responses received in response to executing particular RPC operations. In these embodiments, particular RPC calls requesting execution by the RPC service of the particular RPC operations will always be performed by the RPC services and will not be responded to from the local cache. For example, in one embodiment implemented over a MS-RPC protocol, RPC requests for execution of RPC operations by the SPOOLS RPC service and the corresponding RPC responses are not cached since in most situations the RPC calls for SPOOLS RPC operations are different from each other (e.g. when each RPC calls is for printing a different document), and the RPC responses usually indicate the success or failure of each particular RPC call. Since all RPC calls to the SPOOLS RPC service are different, there will not be much benefit derived from caching the RPC responses. In another example, a client may request from an RPC service an RPC operation that is critical to the operation of the Operating System executing the service. An example of such RPC operation is a RPC call to the WINREG RPC service to update a particular registry key. In this example, the RPC call and RPC response will not be cached because of the critical nature of the RPC call, but instead the RPC call will always be sent to the RPC service for execution.

3.3 Closing Cached Transport Connections and Flushing the Cache

In some embodiments, a local server handling RPC requests from a client to a remote RPC service caches RPC responses received for the client from the RPC service, and delays the closing of the transport connection to the RPC service. In these embodiments, cached transport connection information and cached RPC responses for particular RPC operations are kept in the cache for a relatively short period of time. The time interval for which the information is kept in the cache may be configurable by an administrator of the local server, and may be selected to ensure that the servicing of subsequent RPC requests from the cache does not result in providing erroneous information to the client. The time interval after which cached information is discarded may depend on a variety of criteria including, but not limited to, the nature of the RPC calls and the frequency with which the RPC calls are made by the client.

For example, in one embodiment that is implemented over a MS-RPC protocol, cached information about open pipes may be kept for as long as 30 seconds. Cached information associated with RPC responses to particular RPC operations, such as, for example, the NetrShareEnum and NetrShareGetInfo RPC operations of the SRVSVC RPC service may be kept for as long as 2 seconds. The difference in the above time intervals is based on the nature of the information kept in the cache. Since open pipes can be re-used by any RPC call for execution of a specific RPC operation, they may be kept longer. How long to keep in the cache RPC responses from particular RPC operations, however, depends on the nature of the information returned by the RPC operations. In the above example, 2 seconds may be considered short enough to ensure that the file shares available on a server are very unlikely to change within 2 seconds.

In one embodiment, open transport connections are closed by the local server after the expiration of a predetermined interval of time. The predetermined interval of time may be absolute in the sense that after the time interval for a particular transport connection has expired, the transport connection is closed either in response to receiving a RPC close request from the client or by a dedicated clean-up thread. The predetermined interval of time may also be relative in the sense that it may represent an interval of time during which no RPC requests were made to a particular RPC service over the transport connection.

Alternatively, or in addition to, the local server may employ a clean-up thread that is invoked periodically to examine the contents of the cache. The clean-up thread closes the transport connections that have "expired", and removes from the cache any information associated with closed transport connections. The clean-up thread may also flush from the cache "expired" information that is associated with particular RPC responses. In some embodiments, information may also be removed from the cache in response to detecting or receiving one or more errors. The errors may be associated with the communication link between the local server and the RPC service, or they may be received in response to sending any RPC request or making any RPC call.

3.4 Additional Features and Embodiments

In some embodiments, the local server may deny RPC requests that are sent to certain types of remote RPC services. Examples of RPC services to which RPC requests may be denied by the local server include, but are not limited to, the Microsoft Windows® SPOOLS and WINREG services.

The SPOOLS service is a RPC service that allows a local client to print a document on a printing device that is established in the remote network in which the SPOOLS service is executing. Since a RPC request to the SPOOLS service does not return any data (except for, may be, a notification whether the printing operation succeeded or failed), the local server will not save the client issuing the RPC request any roundtrip communications over the slow communication link. Furthermore, if the slow communication link is of limited bandwidth, denying RPC requests from local clients to a remote SPOOLS service may provide some additional bandwidth may improve the overall utilization and performance of the slow communication link.

The WINREG service is a RPC service that allows a local client to modify the registry settings of computer systems established in the remote network in which the WINREG service is executing. Since the modification of registry settings is considered a critical operation, in some embodiments a local server may deny RPC requests from local clients to a remote WINREG service because of concerns that delays caused by the slow communication links may adversely affect computer systems on which the modification of the registry settings is performed.

Some embodiments may provide additional features to save roundtrip RPC communications over the slow communication link between a local server and a remote server. For example, in one embodiment a local server receives from a local client a RPC request for a remote RPC service. The local server checks the cache to determine whether it contains a valid RPC response to the RPC request. If the local server determines that the cache does not store a valid RPC response, the local server may send a command to the remote server to execute the RPC request at the remote RPC service on behalf of the local client.

Based on the command, the remote server determines one or more RPC operations that need to be executed by the remote RPC service in response to the RPC request of the local client. For example, the one or more RPC operations may include a RPC open call to open a RPC connection from the remote server to the remote RPC service, a RPC bind call to bind the remote server to the remote RPC service, a RPC call to perform the particular operation requested by the local client, and a RPC close call to close the connection to the remote RPC service. The remote server sends the one or more RPC operations to the remote RPC service for execution, and receives the corresponding RPC responses. The remote server then sends to the local server a message that includes the RPC response or responses to the RPC request of the local client.

Thus, in this embodiment when the local server does not have a valid RPC response in the cache, at least four roundtrip RPC communications between the local server and the remote server over the slow communication link are replaced with one roundtrip communication, which includes a command from the local server to the remote server and a message from the remote server to the local server that includes the RPC response or responses to the local client's RPC request.

4.0 Implementation Mechanisms—Hardware Overview

Figure 4:
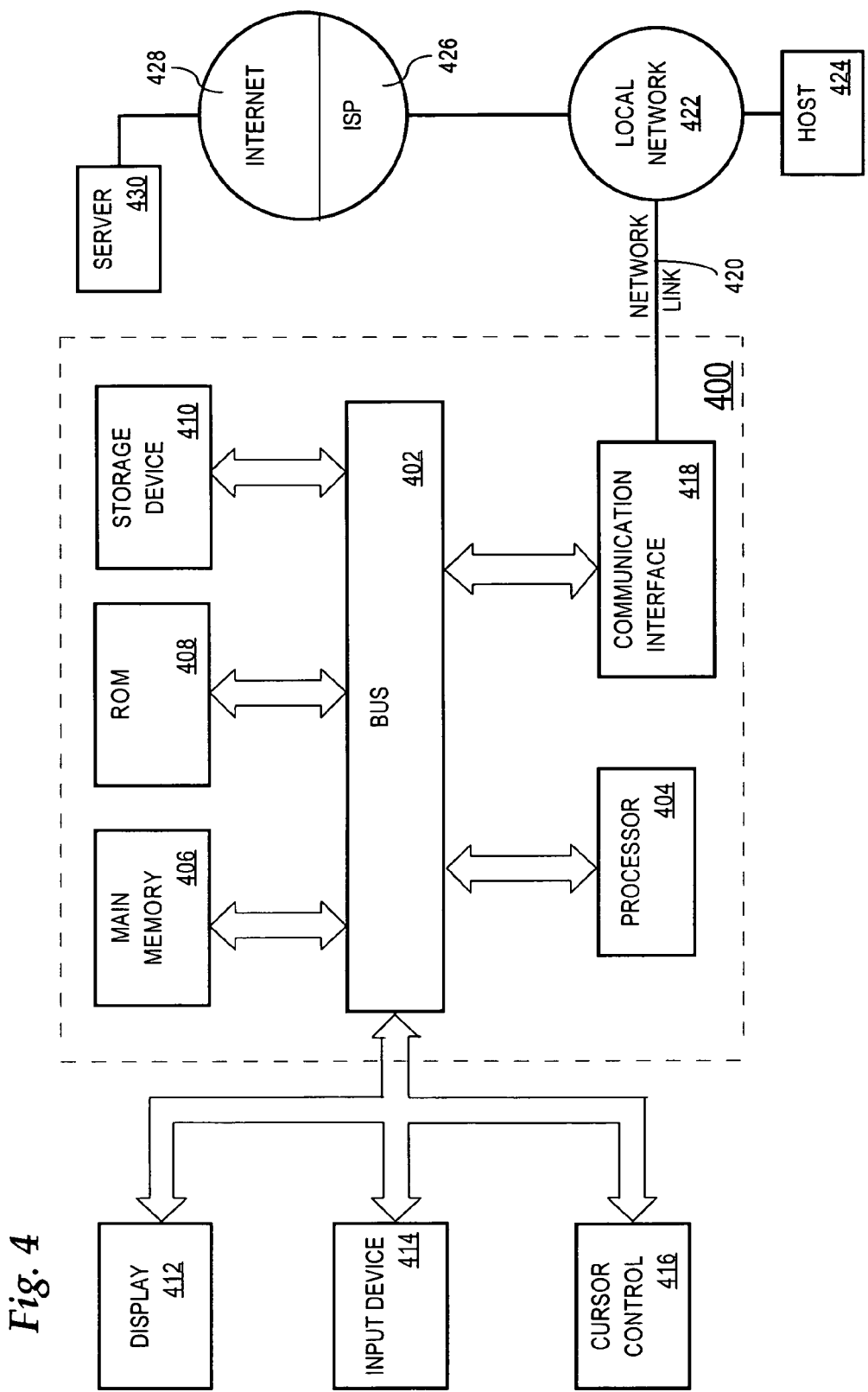
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for optimization of Remote Procedure Call communications. According to one embodiment of the invention, optimization of Remote Procedure Call communications is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for optimization of Remote Procedure Call communications as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for optimization of Remote Procedure Call (RPC) communications, comprising the computer-implemented steps of:

sending a first RPC request to open a first transport connection to a RPC service;
receiving a first RPC response from the RPC service, wherein the first RPC response includes first information which indicates that the first transport connection to the RPC service is open;
wherein the RPC service is configured to execute remote procedure calls sent over the first transport connection;
storing the first information in a cache;
in response to a second RPC request to close the first transport connection, delaying the closing of the first transport connection to the RPC service;
receiving a third RPC request to open a new transport connection to the RPC service;
determining whether there is any open transport connection to the RPC service; and
if it is determined that the first transport connection is still open, then performing the steps of:
retrieving the first information from the cache; and
responding to the third RPC request by creating and sending a second RPC response that includes the first information;
wherein the method is performed by one or more computer systems.

2. The method as recited in claim 1, further comprising:
creating a third RPC response which indicates that the first transport connection is closed even though the closing of the first transport connection has been delayed; and
responding to the second RPC request to close the first transport connection by sending the third RPC response.

3. The method as recited in claim 1, wherein:
the closing of the first transport connection is delayed for a predetermined interval of time; and
the method further comprises closing the first transport connection after the predetermined interval of time expires.

4. The method as recited in claim 3, wherein the predetermined interval of time represents an interval of time during which no RPC operations were sent to the RPC service over the first transport connection.

5. The method as recited in claim 1, wherein the first transport connection is established according to any one of a Server Message Block (SMB) protocol, Transmission Control Protocol (TCP), and HyperText Transfer Protocol (HTTP).

6. The method as recited in claim 1, wherein the steps are performed in a packet-switched network in any of a router, a switch, and a server.

7. A method for optimization of Remote Procedure Call (RPC) communications, comprising the computer-implemented steps of:
receiving from a client a first RPC request to open a first transport connection to a particular RPC service of one or more RPC services, wherein access to the one or more RPC services is managed by a remote server that is communicatively connected over a slow communication link;
sending the first RPC request to the remote server;
receiving a first RPC response from the remote server, wherein the first RPC response includes first information which identifies the first transport connection and indicates that the first transport connection to the particular RPC service is open;
wherein the particular RPC service is configured to execute remote procedure calls sent over the first transport connection;
storing the first information in a cache;
in response to receiving from the client a second RPC request to close the first transport connection to the particular RPC service, delaying the closing of the first transport connection to the particular RPC service;
receiving from the client a third RPC request to open a new transport connection to the particular RPC service;
determining whether there is any open transport connection to the particular RPC service by examining the contents of the cache; and
if it is determined that the first transport connection is still open, then performing the steps of:
retrieving the first information from the cache; and
responding to the third RPC request by performing the steps of:
creating a second RPC response that includes the first information; and
sending the second RPC response to the client;
wherein the method is performed by one or more computer systems.

8. The method as recited in claim 7, further comprising:
creating a third RPC response which indicates that the first transport connection to the particular RPC service is closed even though the closing of the first transport connection has been delayed; and
responding to the second RPC request to close the first transport connection by sending the third RPC response to the client.

9. The method as recited in claim 7, further comprising:
before receiving from the client the second RPC request to close the first transport connection to the particular RPC service, performing the steps of:
receiving, from the client, one or more RPC operations for execution by the particular RPC service;
sending the one or more RPC operations to the remote server over the first transport connection;
receiving from the remote server one or more RPC responses which indicate that the one or more RPC operations have been executed by the particular RPC service; and
storing in the cache the one or more RPC responses; and
after responding to the third RPC request, performing the steps of:
receiving, from the client, a particular RPC operation of the one or more RPC operations for execution by the particular RPC service;
retrieving from the cache a particular RPC response of the one or more RPC responses, wherein the particular RPC response was previously received from the remote server in response to executing the particular RPC operation by the particular RPC service; and
responding to the particular RPC request by sending the particular RPC response to the client.

10. The method as recited in claim 9, wherein:
the first transport connection is any one of a pipe established according to a Server Message Block (SMB) protocol and a socket established according to a Transmission Control Protocol (TCP); and
the particular RPC operation is a RPC bind operation that binds the client to the particular RPC service through the first transport connection.

11. The method as recited in claim 7, further comprising:
closing the first transport connection to the particular RPC service after the expiration of a predetermined interval of time; and
removing the first information from the cache.

12. The method as recited in claim 7, wherein the first transport connection is established according to any one of a Server Message Block (SMB) protocol, Transmission Control Protocol (TCP), and HyperText Transfer Protocol (HTTP).

13. The method as recited in claim 7, wherein:
the first RPC request to open the first transport connection to the particular RPC service is sent from a particular user of one or more users associated with the client; and
storing the first information in the cache further comprises storing second information that is associated with the first information, wherein the second information identifies the particular user of the client.

14. The method as recited in claim 7, wherein:
the slow communication link is established between a local server and the remote server, wherein the slow communication link is any one of a dial-up connection, a Wide Area Network (WAN) connection, a Digital Subscriber Line (DSL) connection, and an Integrated Services Digital Network (ISDN) connection;
the client is communicatively connected to the local server over a first connection; and
the one or more RPC services are communicatively connected to the remote server over a second connection.

15. An apparatus for optimization of Remote Procedure Call (RPC) communications, comprising:
one or more processors;
means for sending a first RPC request to open a first transport connection to a RPC service;
means for receiving a first RPC response from the RPC service, wherein the first RPC response includes first information which indicates that the first transport connection to the RPC service is open;
wherein the RPC service is configured to execute remote procedure calls sent over the first transport connection;
means for storing the first information in a cache;
means for delaying the closing of the first transport connection in response to a second RPC request to close the first transport connection to the RPC service;
means for receiving a third RPC request to open a new transport connection to the RPC service;
means for determining whether there is any open transport connection to the RPC service;
means for retrieving the first information from the cache if it is determined that the first transport connection is still open; and
means for responding to the third RPC request, if it is determined that the first transport connection is still open, by creating and sending a second RPC response that includes the first information.

16. The apparatus of claim 15, further comprising:
means for creating a third RPC response which indicates that the first transport connection is closed even though the closing of the first transport connection has been delayed; and
means for responding to the second RPC request to close the first transport connection by sending the third RPC response.

17. The apparatus of claim 15, wherein:
the closing of the first transport connection is delayed for a predetermined interval of time; and
the apparatus further comprises means for closing the first transport connection after the predetermined interval of time expires.

18. The apparatus of claim 17, wherein the predetermined interval of time represents an interval of time during which no RPC operations were sent to the RPC service over the first transport connection.

19. The apparatus of claim 15, wherein the first transport connection is established according to any one of a Server Message Block (SMB) protocol, Transmission Control Protocol (TCP), and HyperText Transfer Protocol (HTTP).

20. The apparatus of claim 15, wherein the apparatus is any of a router, a switch, and a server.

21. An apparatus for optimization of Remote Procedure Call (RPC) communications, comprising:
one or more processors;
one or more stored sequences of instructions which, when executed by the one or more processors, cause the one or more processors to perform the steps of:
receiving from a client a first RPC request to open a first transport connection to a particular RPC service of one or more RPC services, wherein access to the one or more RPC services is managed by a remote server that is communicatively connected to the apparatus over a slow communication link;
sending the first RPC request to the remote server;
receiving a first RPC response from the remote server, wherein the first RPC response includes first information which identifies the first transport connection and indicates that the first transport connection to the particular RPC service is open;
wherein the particular RPC service is configured to execute remote procedure calls sent over the first transport connection;
storing the first information in a cache;
in response to receiving from the client a second RPC request to close the first transport connection to the particular RPC service, delaying the closing of the first transport connection to the particular RPC service;
receiving from the client a third RPC request to open a new transport connection to the particular RPC service;
determining whether there is any open transport connection to the particular RPC service by examining the contents of the cache; and
if it is determined that the first transport connection is still open, then performing the steps of:
retrieving the first information from the cache; and
responding to the third RPC request by performing the steps of:
creating a second RPC response that includes the first information; and
sending the second RPC response to the client.

22. The apparatus of claim 21, wherein the instructions further cause the one or more processors to perform the steps of:
creating a third RPC response which indicates that the first transport connection to the particular RPC service is closed even though the closing of the first transport connection has been delayed; and
responding to the second RPC request to close the first transport connection by sending the third RPC response to the client.

23. The apparatus of claim 21, wherein the instructions further cause the one or more processors to perform the steps of:
before receiving from the client the second RPC request to close the first transport connection to the particular RPC service, performing the steps of:
receiving, from the client, one or more RPC operations for execution by the particular RPC service;
sending the one or more RPC operations to the remote server over the first transport connection;

receiving from the remote server one or more RPC responses which indicate that the one or more RPC operations have been executed by the particular RPC service; and storing in the cache the one or more RPC responses; and after responding to the third RPC request, performing the steps of:

receiving, from the client, a particular RPC operation of the one or more RPC operations for execution by the particular RPC service;

retrieving from the cache a particular RPC response of the one or more RPC responses, wherein the particular RPC response was previously received from the remote server in response to executing the particular RPC operation by the particular RPC service; and responding to the particular RPC request by sending the particular RPC response to the client.

24. The apparatus of claim 23, wherein:

the first transport connection is any one of a pipe established according to a Server Message Block (SMB) protocol and a socket established according to a Transmission Control Protocol (TCP); and the particular RPC operation is a RPC bind operation that binds the client to the particular RPC service through the first transport connection.

25. The apparatus of claim 21, wherein the instructions further cause the one or more processors to perform the steps of:

closing the first transport connection to the particular RPC service after the expiration of a predetermined interval of time; and removing the first information from the cache.

26. The apparatus of claim 21, wherein the first transport connection is established according to any one of a Server Message Block (SMB) protocol, Transmission Control Protocol (TCP), and HyperText Transfer Protocol (HTTP).

27. The apparatus of claim 21, wherein:

the first RPC request to open the first transport connection to the particular RPC service is sent from a particular user of one or more users associated with the client; and storing the first information in the cache further comprises storing second information that is associated with the first information, wherein the second information identifies the particular user of the client.

28. The apparatus of claim 21, wherein:

the slow communication link between the apparatus and the remote server is any one of a dial-up connection, a Wide Area Network (WAN) connection, a Digital Subscriber Line (DSL) connection, and an Integrated Services Digital Network (ISDN) connection;

the client is communicatively connected to the apparatus over a first Local Area Network (LAN); and the one or more RPC services are communicatively connected to the remote server over a second LAN.

29. A non-transitory computer-readable volatile or non-volatile medium storing one or more sequences of instructions for optimization of Remote Procedure Call (RPC) communications, which instructions, when executed by one or more processors, cause the one or more processors to perform steps comprising:

sending a first RPC request to open a first transport connection to a RPC service;

receiving a first RPC response from the RPC service, wherein the first RPC response includes first information which indicates that the first transport connection to the RPC service is open;

wherein the RPC service is configured to execute remote procedure calls sent over the first transport connection;

storing the first information in a cache;

in response to a second RPC request to close the first transport connection, delaying the closing of the first transport connection to the RPC service;

receiving a third RPC request to open a new transport connection to the RPC service;

determining whether there is any open transport connection to the RPC service; and if it is determined that the first transport connection is still open, then performing the steps of:

retrieving the first information from the cache; and responding to the third RPC request by creating and sending a second RPC response that includes the first information.

30. The non-transitory computer-readable volatile or non-volatile medium of claim 29, wherein the one or more sequences of instructions further comprise instructions which, when executed by the one or more processors, cause the one or more processors to perform the steps of:

creating a third RPC response which indicates that the first transport connection is closed even though the closing of the first transport connection has been delayed; and responding to the second RPC request to close the first transport connection by sending the third RPC response.

31. The non-transitory computer-readable volatile or non-volatile medium of claim 29, wherein:

the closing of the first transport connection is delayed for a predetermined interval of time; and the one or more sequences of instructions further comprise instructions which, when executed by the one or more processors, cause the one or more processors to perform the step of closing the first transport connection after the predetermined interval of time expires.

32. A non-transitory computer-readable volatile or non-volatile medium storing one or more sequences of instructions for optimization of Remote Procedure Call (RPC) communications, which instructions, when executed by one or more processors, cause the one or more processors to perform steps comprising:

receiving from a client a first RPC request to open a first transport connection to a particular RPC service of one or more RPC services, wherein access to the one or more RPC services is managed by a remote server that is communicatively connected by a slow communication link;

sending the first RPC request to the remote server;

receiving a first RPC response from the remote server, wherein the first RPC response includes first information which identifies the first transport connection and indicates that the first transport connection to the particular RPC service is open;

wherein the particular RPC service is configured to execute remote procedure calls sent over the first transport connection;

storing the first information in a cache;

in response to receiving from the client a second RPC request to close the first transport connection to the particular RPC service, delaying the closing of the first transport connection to the particular RPC service;

receiving from the client a third RPC request to open a new transport connection to the particular RPC service;

determining whether there is any open transport connection to the particular RPC service by examining the contents of the cache; and if it is determined that the first transport connection is still open, then performing the steps of:
  retrieving the first information from the cache; and
  responding to the third RPC request by performing the steps of:
    creating a second RPC response that includes the first information; and
    sending the second RPC response to the client.

33. The non-transitory computer-readable volatile or non-volatile medium of claim 32, wherein the one or more sequences of instructions further comprise instructions which, when executed by the one or more processors, cause the one or more processors to perform the steps of:
  creating a third RPC response which indicates that the first transport connection to the particular RPC service is closed even though the closing of the first transport connection has been delayed; and
  responding to the second RPC request to close the first transport connection by sending the third RPC response to the client.

34. The non-transitory computer-readable volatile or non-volatile medium of claim 32, wherein the one or more sequences of instructions further comprise instructions which, when executed by the one or more processors, cause the one or more processors to perform the steps of:
  before receiving from the client the second RPC request to close the first transport connection to the particular RPC service, performing the steps of:
    receiving, from the client, one or more RPC operations for execution by the particular RPC service;
    sending the one or more RPC operations to the remote server over the first transport connection;
    receiving from the remote server one or more RPC responses which indicate that the one or more RPC operations have been executed by the particular RPC service; and
    storing in the cache the one or more RPC responses; and
  after responding to the third RPC request, performing the steps of:
    receiving, from the client, a particular RPC operation of the one or more RPC operations for execution by the particular RPC service;
    retrieving from the cache a particular RPC response of the one or more RPC responses, wherein the particular RPC response was previously received from the remote server in response to executing the particular RPC operation by the particular RPC service; and
    responding to the particular RPC request by sending the particular RPC response to the client.

35. The non-transitory computer-readable volatile or non-volatile medium of claim 32, wherein the one or more sequences of instructions further comprise instructions which, when executed by the one or more processors, cause the one or more processors to perform the steps of:
  closing the first transport connection to the particular RPC service after the expiration of a predetermined interval of time; and
  removing the first information from the cache.

36. The non-transitory computer-readable volatile or non-volatile medium of claim 32, wherein:
  the first RPC request to open the first transport connection to the particular RPC service is sent from a particular user of one or more users associated with the client; and
  the instructions that cause the one or more processors to perform the step of storing the first information in the cache further comprise instructions which, when executed by the one or more processors, cause the one or more processors to perform the step of storing second information that is associated with the first information, wherein the second information identifies the particular user of the client.

* * * * *